United States Patent [19]

Kuraoka et al.

[11] Patent Number: 4,700,982
[45] Date of Patent: Oct. 20, 1987

[54] OPEN-TOP VEHICLE HAVING A POWER OPERATED ROOF STRUCTURE

[75] Inventors: Koji Kuraoka; Morio Umeda; Takeshi Konishi; Takanori Tuchiya, all of Hiroshima, Japan

[73] Assignee: Mazda Motor Corporation, Hiroshima, Japan

[21] Appl. No.: 855,634

[22] Filed: Apr. 25, 1986

[30] Foreign Application Priority Data

Apr. 27, 1985 [JP] Japan ................... 60-91437

[51] Int. Cl.$^4$ ............ B60J 7/11; B60J 7/12; B60R 21/13
[52] U.S. Cl. .................. 296/107; 296/218; 280/756; 180/281; 318/560
[58] Field of Search .............. 296/107–109, 296/111, 112, 117, 118, 216, 218, 219; 280/756; 180/281; 318/560

[56] References Cited

U.S. PATENT DOCUMENTS

| 3,575,604 | 4/1971 | Smith | 180/281 X |
| 3,765,502 | 10/1973 | Mark | 180/281 |
| 4,278,922 | 7/1981 | Grebe | 296/223 X |
| 4,557,502 | 12/1985 | Scaduto et al. | 296/109 X |
| 4,572,570 | 2/1986 | Trucco | 296/147 X |
| 4,644,235 | 2/1987 | Ohta | 296/117 X |

FOREIGN PATENT DOCUMENTS

| 814396 | 9/1951 | Fed. Rep. of Germany | 296/107 |
| 1536276 | 12/1978 | United Kingdom | 180/281 |
| 2086316 | 5/1982 | United Kingdom | 296/107 |

Primary Examiner—D. H. Pedder
Attorney, Agent, or Firm—Fleit, Jacobson, Cohn & Price

[57] ABSTRACT

An open-top vehicle including a foldable hood supported by a U-shaped pillar and a linkage for extending and folding the hood and pillar. At each side, a reversible motor is provided for actuating the linkage. There is provided a motor control circuit which prohibits motor operation when the vehicle speed is above a predetermined value.

11 Claims, 10 Drawing Figures

OPEN-TOP VEHICLE HAVING A POWER OPERATED ROOF STRUCTURE

BACKGROUND OF THE INVENTION

1. Field of the Invention

The present invention relates to a vehicle upper body structure, and more particularly to an upper body structure of an open-top type which includes a foldable hood structure for covering at least a rear upper part of the vehicle body.

2. Description of the Prior Art

Conventionally, among open-top type motor vehicles, a so-called convertible type has widely been known. Such type of motor vehicles include a foldable hood structure which is adapted to cover the roof and rear windshield portions but can be folded into the rear body section as desired to fully open the top portion of the vehicle body. The hood structure includes a foldable hood and a hood stretching linkage which is provided inside the hood and serves to stretch the hood when erected. Usually, the hood structure is moved into an extended position by hand through manual actuations of the linkage.

The British laid open patent application No. 2,086,316 discloses a new type of open-top vehicle body which includes a hoop member of a substantially U-shaped configuration having a pair of leg portions mounted on the vehicle body for swinging movement about an axis transverse to the body. A foldable hood is provided between the hoop member and the rear body section and a rigid roof panel is removably mounted in the roof portion between the hoop member and the front windshield. In the proposed body structure, the hoop member is manually actuated to move the hood between an extended position and a retracted position.

It should be noted, however, that such manual actuation is carried out at one side of the vehicle body so that the hoop member or the stretching linkage is twisted during operation thus disturbing a uniform stretching of the hood structure. However, in case where such provisions are made, there is a high possibility that the actuation of the hoop member is carried out when the vehicle is running. Such actuation of the hoop member while the vehicle is running will cause an abrupt change in the aeronautical drag so that the vehicle body is made unstable. This trend will be particularly significant when the vehicle speed is high.

SUMMARY OF THE INVENTION

It is therefore an object of the present invention to provide an open-top vehicle in which the hood structure can be operated by motor means without a risk of having the hood structure operated while the vehicle is running at a high speed.

Another object of the present invention is to provide an open-top vehicle having motor means for moving the hood structure between the extended and retracted positions only when the vehicle is stationary and running under a speed lower than a predetermined speed.

According to the present invention, the above and other objects can be accomplished by an open-top vehicle including a body section, retractable roof means movable between an extended position wherein the roof means covers a roof portion of the body section and a retracted position wherein the roof means is retracted into the body section, drive means for moving the roof means between the extended position and the retracted position, vehicle speed detecting means for detecting running speed of the vehicle, prohibiting means responsive to the running speed of the vehicle for prohibiting the drive means to move said roof means at least from one of the extended position and the retracted position to the other.

The above and other objects and features of the present invention will become apparent from the following descriptions of a preferred embodiment taking reference to the accompanying drawings.

DESCRIPTION OF PREFERRED EMBODIMENTS

Figure 1A:
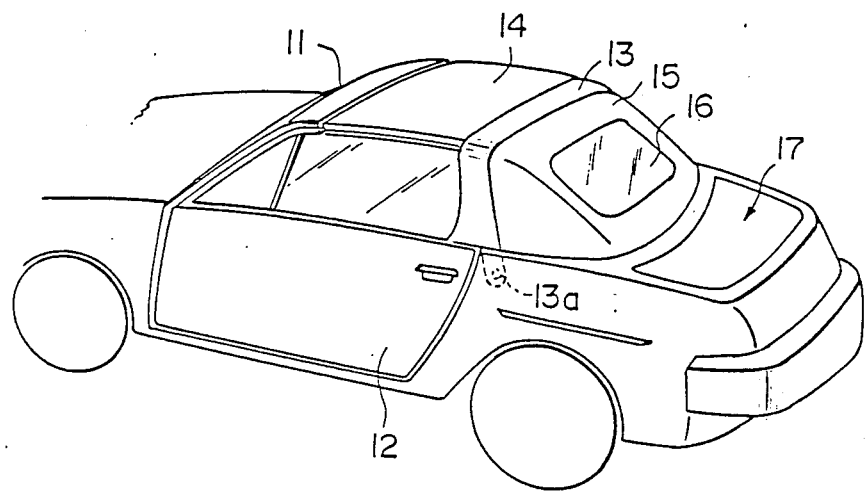
FIG. 1A is a perspective view showing an open-top vehicle in accordance with one embodiment of the present invention with the roof structure in the extended position.

Referring to the drawings, particularly to FIG. 1A, the vehicle body shown therein includes a front windshield assembly 11, a pair of side doors 12 and a rear body section 17. On the rear body section 17, there is mounted a swingable pillar 13 of an inverted U-shape. The swingable pillar 13 is located rearward the side doors 12 and has a pair of leg portions 13a mounted on the opposite side panels of the rear body section 17 for swingable movement from the erecterd position shown in FIG. 1A rearwardly to a retracted position shown in FIG. 1C.

Between the crest portion of the swingable pillar 13 in the erected position and the top edge portion of the front windshield assembly 11, there is mounted a roof panel 14 which is removable as desired. A rear hood 15 is provided between the swingable pillar 13 and the rear body section 17. The hood 15 has a transparent glass 16 in the central portion and attached at the front edge to the swingable pillar 13 and at the lower edge to the rear body section 17.

Figure 1B:
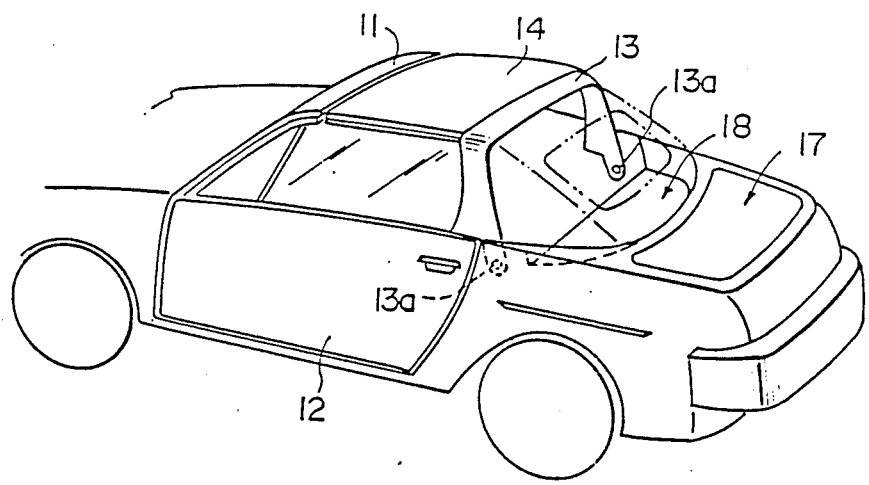
FIG. 1B is a perspective view of the vehicle shown in FIG. 1A with the hood section removed to show the interior.
Figure 1C:
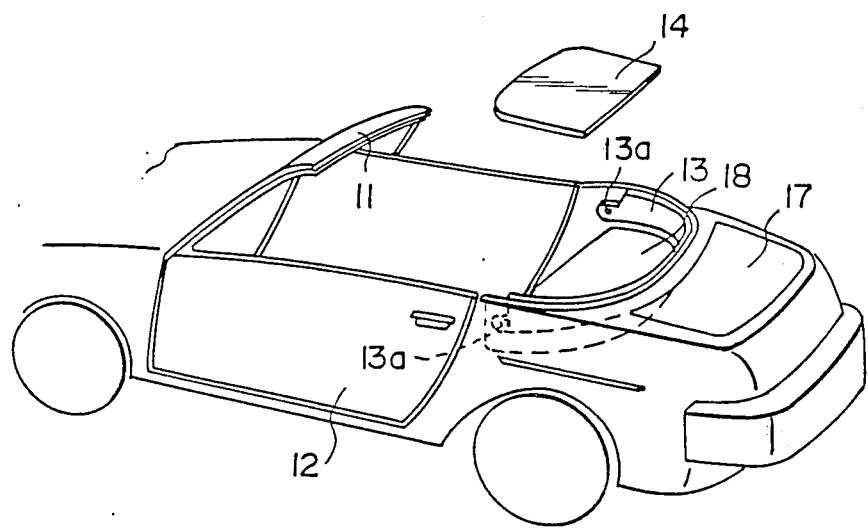
FIG. 1C is a perspective view showing the hood section in the retracted position.

Referring to FIG. 1B, it will be noted that the rear body section 17 is formed with a recess 18 for receiving the pillar 18 and the hood 15 when they are retracted. For moving the swingable pillar 13 to the retracted position, the roof panel 14 is at first removed and put in a suitable space such as a trunk room. Then, the pillar 13 is swingably moved rearwards so that the pillar 13 and the hood 15 are retracted beneath the belt line of the rear body section 17.

Figure 2:
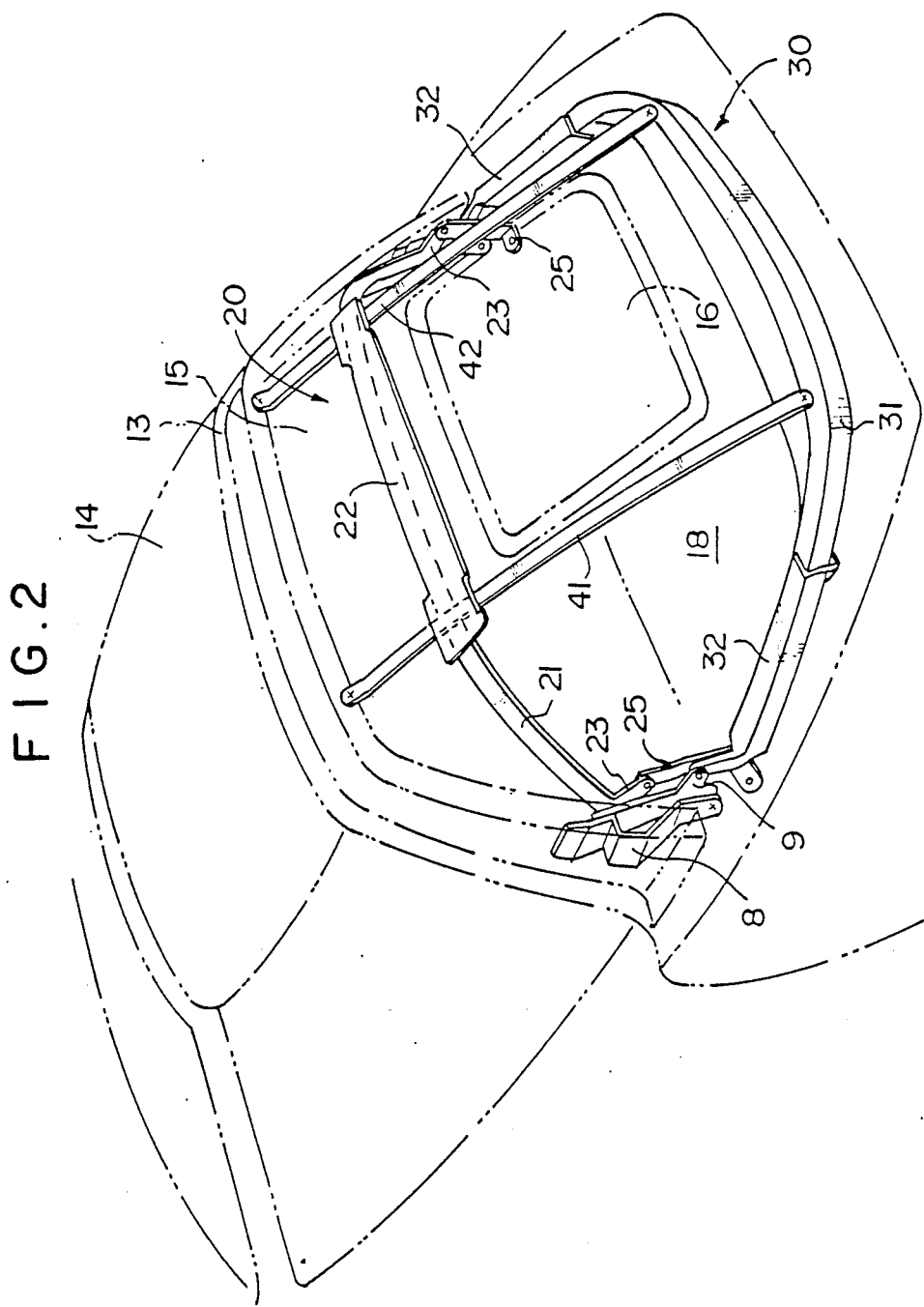
FIG. 2 is a perspective view showing the hood stretching linkage.

When the pillar 13 is in the erected positon to extend the hood 15, it is necessary to stretch the hood 15. For the purpose, a hood stretching linkage is provided inside the hood 15 as shown in FIG. 2. The linkage includes an upper stretching link assembly 20 having an upper link 21 of a substantially inverted U-shape. The link 21 is provided at the central portion with a stretching bar 22 adapted to be engaged with the inner surface of the hood 15 between the pillar 13 and the transparent glass 16. The linkage further includes a peripheral stretching link assembly 30 adapted for engagement with the inner surface of the hood 15 at the lower side portions and the lower reat portion thereof. A pair of flexible bands 41 and 42 are provided to extend between the pillar 13 and the peripheral hood stretching link 30. Each of the bands 41 and 42 is connected at the front end with the pillar 13 and passed between the link 21 and the stretching bar 22 to be connected at the rear end to the peripheral stretching link assembly 30.

The upper link 21 has opposite leg portions 23 which are pivotably mounted on the pillar 13. The leg portion 23 is formed with a rearwardly projecting lug which is pivotably connected with an upper end of a lower link 25 which is in turn pivotably mounted at the lower end on the rear body section 17. The link assembly 30 includes a rear link 31 of a substantially U-shaped configuration and a pair of front links 32 having rear ends pivotably connected with the opposite ends of the rear link 31. The front ends of the front links 32 are pivotably connected with the pillar 13. A first plate 8 and a second plate 9 are provided at each leg portion of the pillar 13 for the purpose of reinforcing the connection between the pillar 13 and the upper link 21 and the connection between the pillar 13 and the front link 32.

Figure 3:
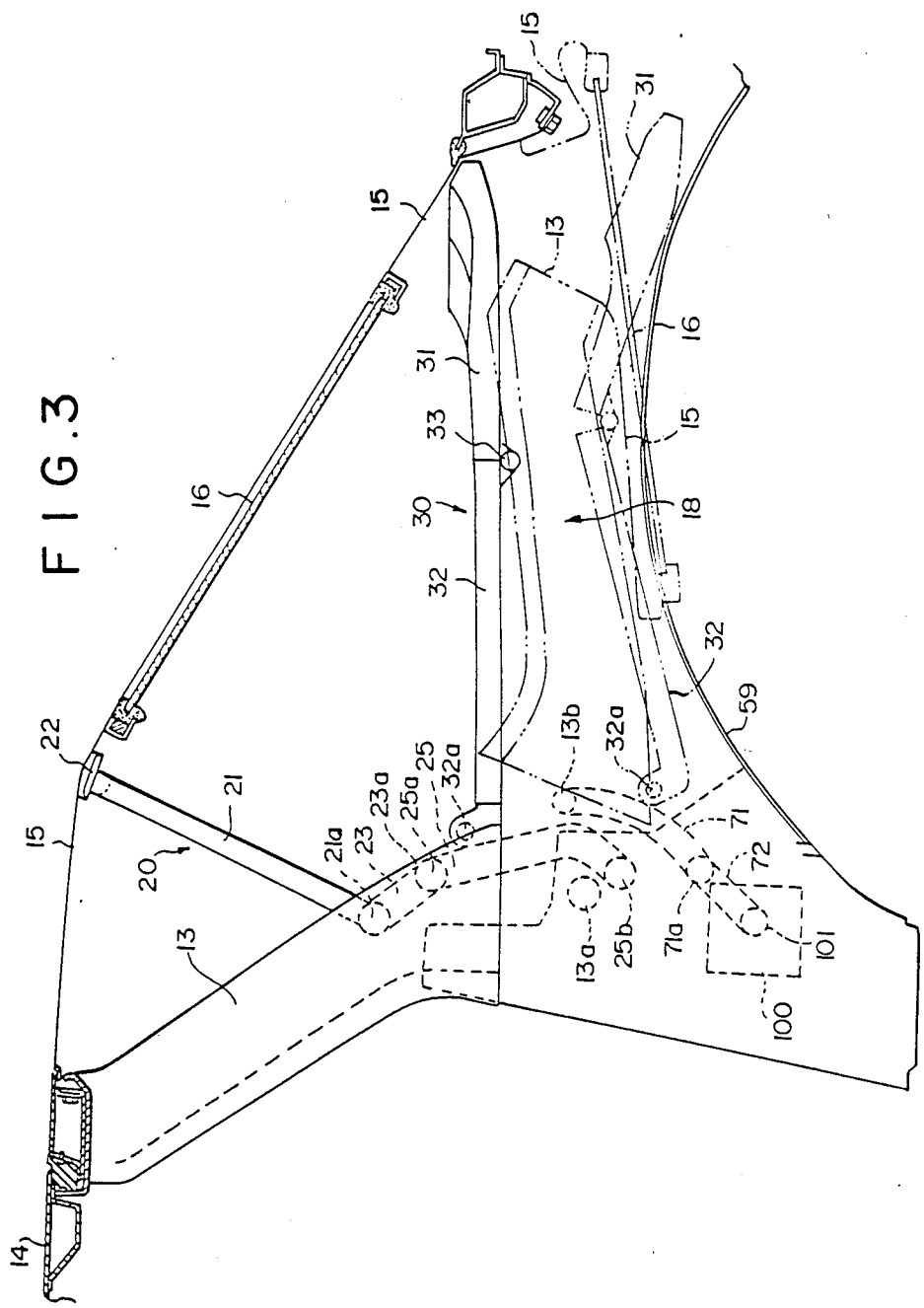
FIG. 3 is a side view of the linkage.
Figure 4:
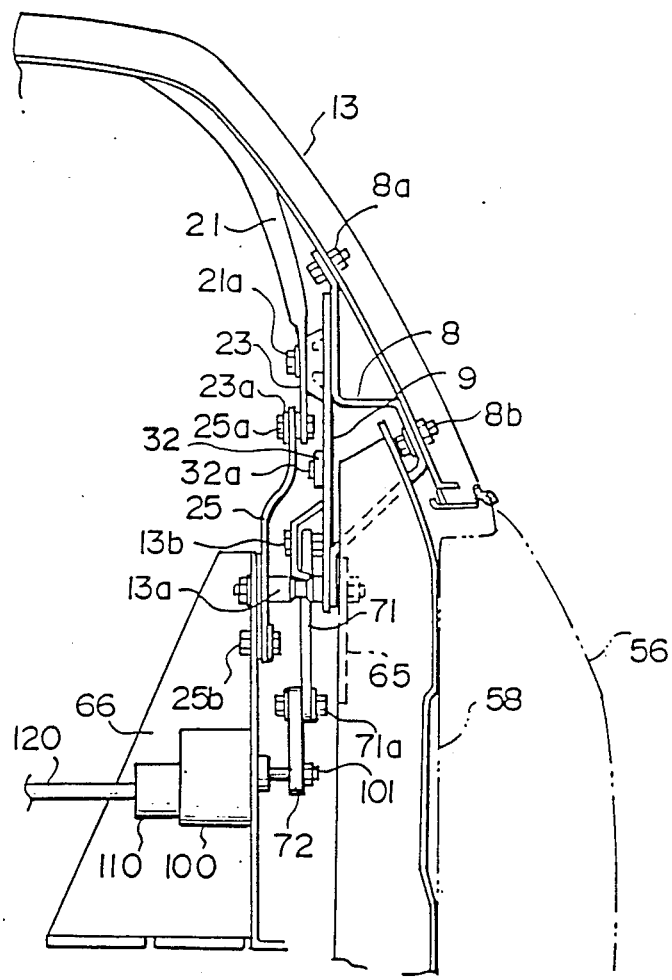
FIG. 4 is a front view of the linkage.
Figure 7:
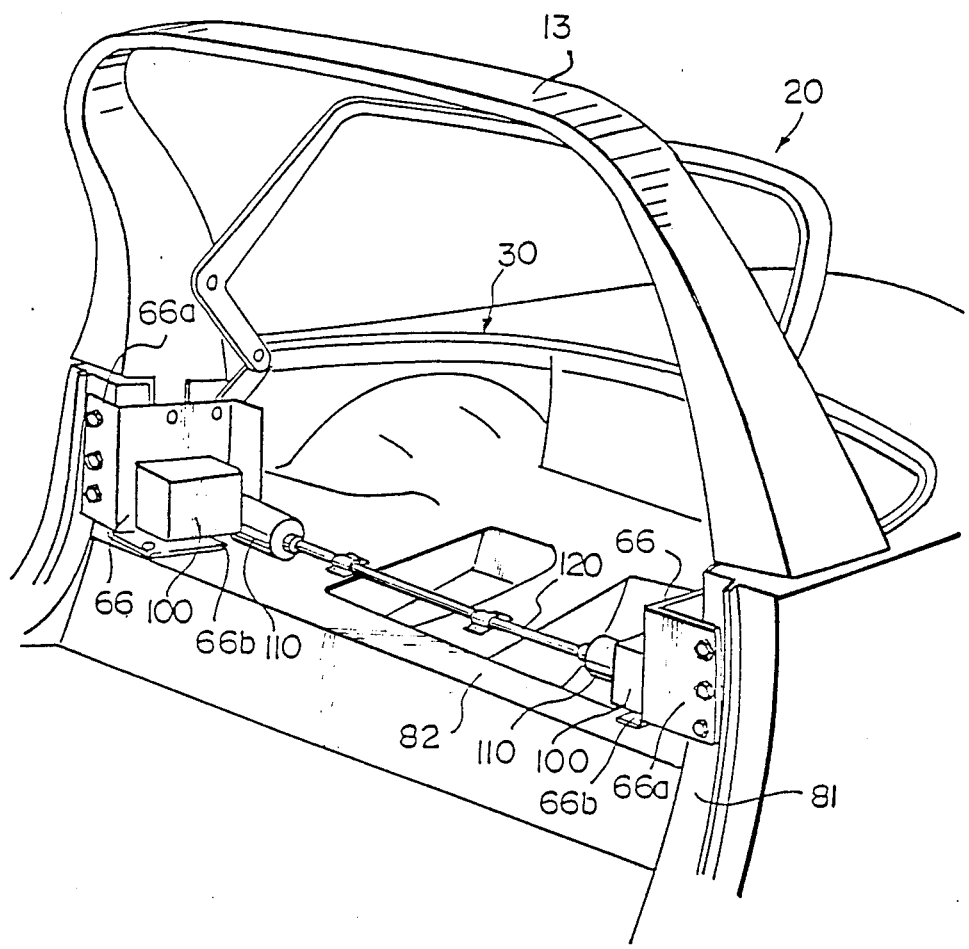
FIG. 7 is perspective view of the mechanism for moving the swingable member; and, FIG. 8 is a circuit diagram showing the control circuit for controlling the drive motor.

Referring now to FIG. 4, it will be noted that the plate 8 is secured to the pillar 13 by means of bolts 8a and 8b and the plate 9 is welded to the plate 8. The lower ends of the plates 8 and 9 are mounted pivotably by means of a pivot shaft 13a on brackets 65 and 66 which are provided on the rear body section 17. Thus, the pillar 13 is swingable about the pivot shaft 13a. In FIG. 3, the pivot shaft 13a is shown by a dotted line. On the plate 9, there is provided a pivot shaft 13b which is located rearward the shaft 13a. A first link 71 is mounted at one end on the pivot shaft 13b, the other end 71a of the first link 71 being connected with one end of a second link 72 which is in turn secured at the other end to an output shaft 101 of a gear box 100. As shown in FIGS. 4 and 7, the gear box 100 is connected with a motor 110 so that the rotation of the motor 110 is transmitted through the gear box 100 to the second link 72. The movement of the second link 72 is then transmitted through the first link 71 to the pillar 13 to cause a swingable movement of the pillar 13 about the pivot shaft 13a. The aforementioned mechanism is provided at each leg portion of the pillar 13. In order to synchronize the operations of the motors 110 at the respective sides of the body section, the output shafts of the motors 110 are connected by a rod or a flexible shaft 120. An upper limit switch 91 is provided so that it is operated by the second link 72 when the pillar 13 is in the erected position. Further, a lower limit switch 92 is provided so that it is operated by the second link 72 when the pillar 13 is in the retracted position.

In the extended position of the hood 15, the upper stretching link assembly 20 functios to stretch the hood 15 by having the stretching bar 22 engaged with the hood between the pillar 13 and the glass 16. Therefore, the front portion of the hood 15 provides a continuous contour with respect to the roof panel 14. The rear view is therefore ensured through the glass 16. Since a sufficient length can be provided in the front portion of the hood 15 for folding the hood 15 in the space 18, the glass 16 can possess a substantial part of the rear potion of the hood to ensure an adequate rear view.

As shown in FIGS. 3 and 4, the upper link 21 is mounted pivotably at the lower end portion of each leg 23 by means of a pivot pin 21a. The rearwardly extending lug of the leg poriton is pivotably connected with the upper end of the lower link 25 by mean of a pivot pin 25a. The lower end of the lower link 25 is pivotably mounted on the bracket 66 by means of a pivot pin 25b.

The front end of each front link 32 is pivotably connected with the plate 9 by means of a pivot pin 32a so that the peripheral stretching link assembly 30 is brought into engagement with the lower side and rear portions of the hood 15 to stretch the same when the pillar 13 is in the erected position. It will be understood that the link assemblies 20 and 30 are both mounted on the plate 9 so that the link assemblies 20 and 30 can be received in the recess 18 when the pillar 13 is moved to the retracted position.

Figure 5:
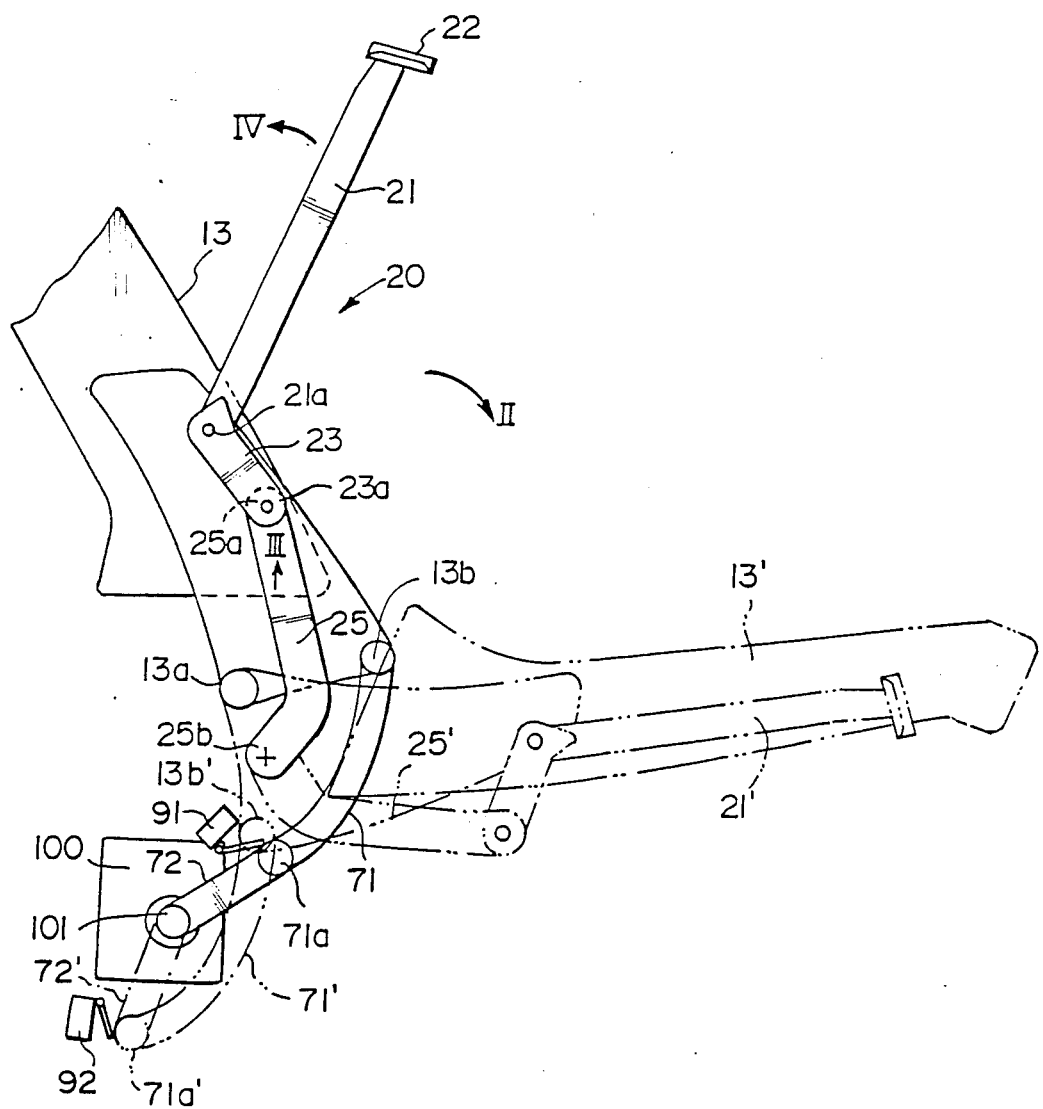
FIG. 5 is an enlarged view of the upper hood stretching linkage.

Referring to FIG. 5, the pillar 13 and the upper stretching link assembly 20 are shown in the erected position by solid lines. When the motor 110 is energized in this position to rotate the output shaft 101 of the gear box 100 in clockwise direciton, the pillar 13 is swung rearward about the pivot shaft 13a as shown by an arrow II. The upper link 21 is then moved together with the pillar 13. At the same time, the lower link 25 is swung rearward about the pivot pin 25b. Since the pivot pin is located below the pivot shaft 13a, the movement of the lower link 25 is such that it tends to push the lug on the upper link 21 upward as shown by an arrow III. Thus, the upper link 21 is folded about the pivot pin 21a toward the pillar 13 as shown by an arrow IV. It will therefore be understood that the upper link 21 is completely folded in the pillar 13 when the pillar 13 is retracted in the recess 18 as shown by phantom lines with primed reference numerals.

Figure 6:
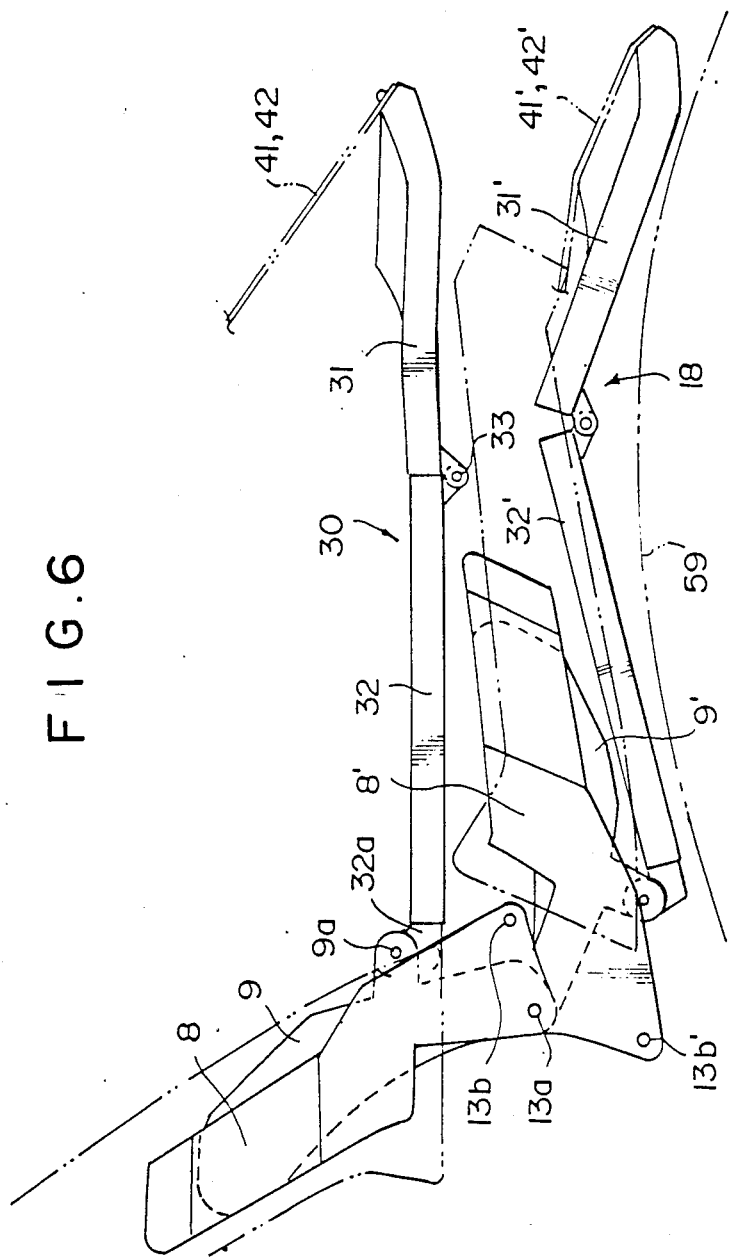
FIG. 6 is an enlarged view of the peripheral hood stretching linkage.

Referring to FIG. 6, the link assembly 30 extends substantially horizontally when the pillar 13 is in the erected position as shown by solid lines. When the pillar 13 is swung rearward from this position, the plates 8 and 9 are moved to the positions shown by references numerals 8' and 9' to be received in the recess 18. The rear link 31 and the front links 32 are therefore received by the recess 18. The links 31 and 32 can lie along the contour of a tire house 59 by being pivoted about the pin 33.

Figure 8:
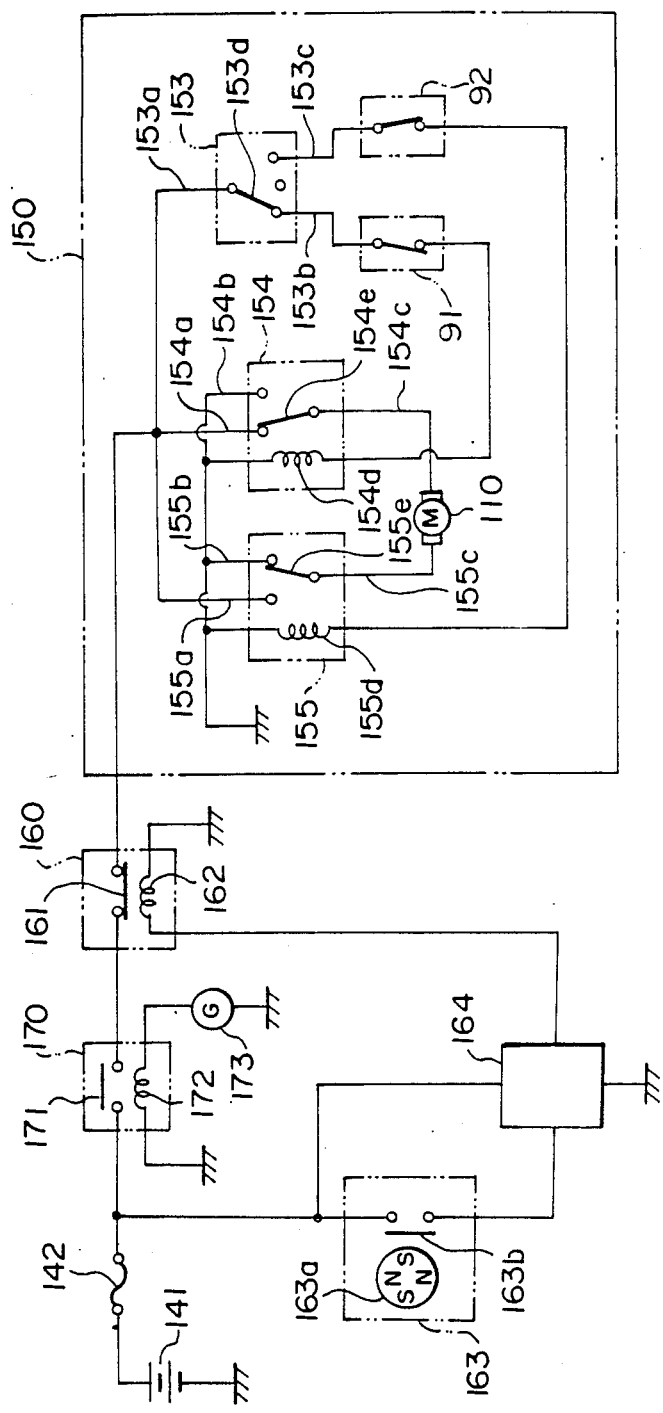

Referring now to FIG. 8, there is shown a circuit for controlling the motor 110. The circuit includes a motor drive circuit 150 having a first relay 154 and a second relay 155 which are connected with the motor 110. Specifically, the first relay 154 has a power terminal 154a connected through a high speed cut-off relay switch 160, an engine switch 170 and a fuse 142 with a power sourse 141. Further, the first relay 154 includes a ground terminal 154b which is grounded. A motor terminal 154b which is connected with the motor 110 has a movable contact 154e which is adapted to connect the terminal 154c alternately with the terminal 154a or 154b. A solenoid coil 154d is provided for moving the contact 154e to connect the terminal 154c with the terminal 154a when energized. The contact 154e is spring biased so that it engages the terminal 154b when the solenoid coil 154d is deenergized. The solenoid coil 154d is connected at one end to the ground and at the other end through an upper limit switch 91 and a manual switch 153 with the high speed cut-off switch 160 which leads to the power source 141 through the engine switch 170 and the fuse 142. The upper limit switch 91 is normally closed but opened when the movable pillar 13 is in the erected position.

The second relay 155 is similarly constructed and has power terminal 155a, a ground terminal 155b, a motor terminal 155c, a solenoid coil 155d and a movable contact 155e. The solenoid coil 155d is connected with the manual switch 153 through a lower limit switch 92 which is normally closed but opened when the movable pillar 13 is in the retracted position. The manual switch 153 has a power terminal 153a leading to the power source 141, an erecting terminal 153b connected with the upper limit switch 91 and a retracting terminal 153c connected with the lower limit switch 92. A manually operated movable contact 153d is provided for alternately connecting the power terminal 153a with the terminal 153b or 153c. It will be understood that, when the contact 153d is moved to be engaged with the erecting terminal 153b, the solenoid coild 154d of the first relay 154 is energized so that the motor 110 is operated in the direction of erecting the pillar 13. When the pillar 13 reaches the erected position, the limit switch 91 is opened to thereby deenergize the solenoid 154d and stop the motor 110. When the contact 153d is moved to be engaged with the retracting terminal 153c, the motor 110 is operated in the opposite direction.

The circuit further includes a vehicle speed detector in the form of a pulse generator 163 which includes a magneticaly polarized rotor 163a and a magnetically operated switch 163b. The rotor 163a is driven by a wheel drive axle and operates the switch 163b with a frequency proportional to the vehicle speed. Thus, the pulse generator 163 produces output pulses of which frequency is proportional to the vehicle speed. The output of the pulse generator 163 is connected with a pulse counter 164 which produces an output when the frequency of the pulse generator 163 is above a predetermined value.

The high speed cut-off relay 160 includes a normally closed switch 161 and a solenoid coil 162 which functions to open the switch 161 when energized. The solenoid coil 162 is grounded at one end and connected at the other end with the output of the pulse counter 164. It will therefore be understood that the relay 160 is opened when the output frequency of the pulse generator 163 and therefore the vehicle speed is above a predetermined value to thereby cut the power supply to the motor drive circuit 150.

The engine switch 170 includes a normally open switch 171 and a solenoid coil 172 which functions to close the switch 171 when it is energized. The solenoid coil 170 is grounded at one end and connected with an engine driven generator 173. It will therefore be understood that the power supply to the motor drive circuit 150 is maintained only when the engine is being operated and the vehicle speed is lower than the predetermined value. In the embodiment described the operation of the motor 110 is disabled under a high vehicle speed both in the movements of erecting and retracting the pillar 13. It should however be noted that the arrangement may be such that motor operation be disabled only in one direction of operation. For example, when the pillar 13 is moved toward the erected position, there will be an abrupt increase in the aeronautical drag so that motor operation in this direction only may be prohibited under a high vehicle speed. The roof structure may be of any type which can be operated by a motor.

The invention has thus been shown and described with reference to a specific embodiment, however, it should be noted that the invention is in no way limited to the details of the illustrated structures but changes and modifications may be made without departing from the scope of the appended claims.

We claim:

1. An open-top vehicle including a body section, retractable pillar means movable between an extended position where the pillar means extends above a rear portion of the body section and a retracted position where the pillar means is retracted into the rear portion of the body section, drive means for moving the pillar means between the extended position and the retracted position, vehicle speed detecting means for detecting running speed of the vehicle, prohibiting means responsive to the running speed of the vehicle for prohibiting the drive means to move said pillar means at least from one of the extended position and the retracted position to the other, said pillar means being of a substantially inverted U-shape having leg portions pivotably connected with said body section for movement between an erected position which corresponds to said extended position of the roof means and a retracted position, foldable hood means connected with said pillar means and adapted for covering a rear top portion of said body section, said foldable hood means having transparent means providing rear window means, roof panel means of a rigid structure for covering a front top portion of the body section, said drive means including motor means having output shaft means and link means including a link having one end articulatedly connected with the output shaft means and the other end pivotably connected with said leg portion of the pillar means at a position rearward of a position where said leg portion is connected with the body section.

2. A vehicle in accordance with claim 1 which includes limit switch means adapted to be operated by said link means when the pillar means is in the erected position.

3. A vehicle in accordance with claim 1 which includes limit switch means adapted to be operated by said link means when the pillar means is in the retracted position.

4. A vehicle in accordance with claim 1 in which said motor means includes a pair of motors adapted for driving respective one of said leg portions of the pillar means.

5. A vehicle in accordance with claim 1 in which said roof panel means is removably mounted.

6. A vehicle in accordance with claim 1 which includes upper hood stretching means for engaging the hood means between the movable pillar means and said transparent means and for stretching an upper portion of the hood means when said pillar means is in the erected position.

7. A vehicle in accordance with claim 1 in which sid hood means has side and rear edge portions secured to said body section beneath a peripheral portion of recess means where said hood means is to be folded, peripheral hood stretching means for engaging the hood means in the vicinity of the peripheral portion of the recess means for stretching the peripheral portion of the hood means when the pillar means is in the erected position.

8. A vehicle in accordance with claim 1 in which said drive means includes electric motor means and motor control means which comprises manual switch means and relay means responsive to operations of the manual switch means for reversibly controlling electric current flow to said motor means.

9. A vehicle in accordance with claim 8 in which said motor control means includes limit switch means for cutting an electric current supply when the roof means is moved to a desired position which is one of said extended and retracted position.

10. A vehicle in accordance with claim 8 in which said prohibiting means includes relay means provided between power source means and said motor control means.

11. A vehicle in accordance with claim 1 in which said vehicle speed detecting means includes pulse generating means which produces output pulses of a frequency representing the running speed of the vehicle.

* * * * *